Patented Jan. 20, 1925.

1,523,390

UNITED STATES PATENT OFFICE.

JOHN BREEDIS AND EDWARD CREDE, OF PHILADELPHIA, PENNSYLVANIA, ASSIGNORS TO ROHM & HAAS COMPANY, A CORPORATION OF DELAWARE.

TANNING COMPOUNDS OBTAINED FROM RESINS.

No Drawing.     Application filed February 23, 1924. Serial No. 694,766.

*To all whom it may concern:*

Be it known that we, JOHN BREEDIS and EDWARD CREDE, citizens of the United States, and residents of Philadelphia, county of Philadelphia, Pennsylvania, have invented certain new and useful Improvements in Tanning Compounds Obtained from Resins, of which the following is a specification.

We have discovered that highly useful tans can be made by sulphonating various natural resins. These resins ordinarily are substantially insoluble in water but when treated with sulphuric acid the resulting sulphonation product is readily soluble. We have found that the various resinous gums such as marrikino gum or yaka gum (exudations of the West Australian red gum trees) can be used for this purpose and also other material such as rosin. The gum or resin is first dissolved in a proper solvent such as phenol, cresol or alcohol. It is then mixed with sulphuric acid at a proper temperature and after sulphonation has been completed, any excess acid is neutralized and the tan produced in the usual acid form. It is to be understood that when we state that excess acid is neutralized we do not intend to mean that the product is brought to a neutral condition but only to the slight degree of acidity which it is recognized is desirable.

The manner of carrying out our invention can be readily understood from the two following illustrative examples:

Example 1. One part of marrikino gum was dissolved in one part of phenol and the solution thus produced was treated at about 70° C. with two parts of concentrated sulphuric acid until sulphonation and condensation was completed as indicated by a change in color of the product and its assuming uniform consistency. The product was titrated and sufficient caustic soda added to leave it slightly acid. This product was readily soluble in water and had excellent tanning qualities.

Example 2. One part of marrikino gum was powdered and added direct to two parts of oleum (20%) at a temperature of 40° C. After a change in color and uniform consistency had shown that sulphonation was completed the mixture was diluted with water and the excess of sulphuric acid neutralized as before. Again the product was soluble and showed good tanning qualities.

It is to be understood that these examples are given by way of illustration only and that many modifications may be made in them without departing from the spirit of our invention.

What we claim is:

1. A tan comprising a sulphonated resin.
2. A tan comprising the reaction product of sulphuric acid and a resin.
3. A tan comprising the reaction product of marrikino gum and sulphuric acid.
4. The method of converting a resin into a material soluble in water and available for use as a tan which comprises the step of heating such resin in the presence of sulphuric acid.
5. In the art of producing a tan from a resin, the step of sulphonating such a resin.
6. A tan comprising the reaction product of sulphuric acid, phenol and a resin.
7. The method of converting a resin into a material soluble in water and available for use as a tan, which comprises the step of heating such resin in the presence of sulphuric acid and phenol.

JOHN BREEDIS.
EDWARD CREDE.